United States Patent
Vijeh

(10) Patent No.: US 7,064,492 B1
(45) Date of Patent: Jun. 20, 2006

(54) AUTOMATIC AMBIENT LIGHT COMPENSATION FOR DISPLAY BACKLIGHTING

(75) Inventor: Khosrow Vijeh, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/684,333

(22) Filed: Oct. 10, 2003

(51) Int. Cl.
*H05B 37/00* (2006.01)

(52) U.S. Cl. .................. 315/149; 315/159; 315/307

(58) Field of Classification Search ............ 315/169.3, 315/307, 149, 159
See application file for complete search history.

(56) References Cited

U.S. PATENT DOCUMENTS 5,118,992 A * 6/1992 Szuba .................. 315/158
5,754,013 A * 5/1998 Praiswater ................. 315/307
2004/0037094 A1* 2/2004 Muegge et al. .......... 363/21.16

* cited by examiner

*Primary Examiner*—David Vu
(74) *Attorney, Agent, or Firm*—Merchant & Gould P.C.; Mark R. Hennings

(57) ABSTRACT

Control circuitry is used to control the backlighting of electronic displays. A light sensor (such as a phototransistor) is used to continuously measure ambient light conditions that are associated with an electronic display. A linear, continuous light-level signal is produced in response to the continuous measuring by the light sensor. The light-level signal is applied to a first input pin of an operational amplifier. The operational amplifier produces an output signal that is linear with respect to the light-level signal. The output signal is coupled to a second input pin, which provides feedback for the amplifier. The output signal is further coupled to an LED driver for driving backlighting LEDs.

13 Claims, 5 Drawing Sheets

AUTOMATIC AMBIENT LIGHT COMPENSATION FOR DISPLAY BACKLIGHTING

FIELD OF THE INVENTION

The present invention relates to electronic displays, and more particularly to control circuitry for backlighting of the electronic displays.

BACKGROUND OF THE INVENTION

The rate of power consumption in modern electronic devices is increasingly important. In particular, portable electronic devices often rely upon battery power, which is limited. The limited battery power limits, for example, the number of hours for which a portable electronic device can operate. Accordingly, reducing the rate of power consumption in portable electronic devices can extend the operating time of a device and/or allow increased device functionality without decreasing the operating time. Illumination of displays within electronic devices typically consumes relatively large quantities of power, which can greatly decrease the device operating time when display illumination is used.

An appreciation of the present invention and its improvements can be obtained by reference to the accompanying drawings that are briefly summarized below, to the following detailed description of illustrated embodiments of the invention, and to the appended claims.

BRIEF DESCRIPTION OF THE DRAWINGS

Non-limiting and non-exhaustive embodiments of the present invention are described with reference to the following drawings.

DETAILED DESCRIPTION OF THE PREFERRED EMBODIMENT

Figure 1:
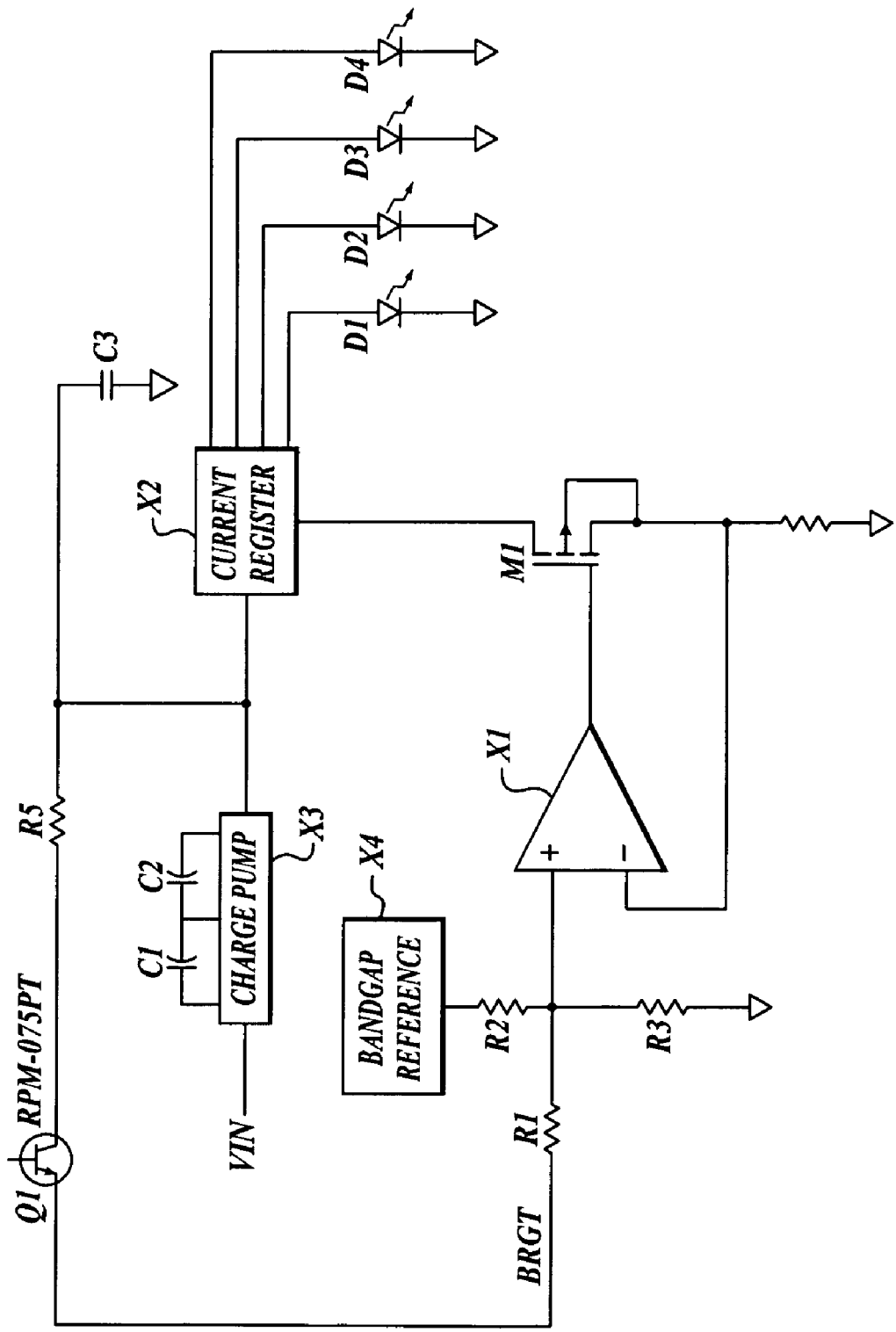
FIG. 1 illustrates an example of switched capacitor automatic ambient light compensation circuit that is arranged in accordance with aspects of the present invention.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other signal.

An example area in which significant improvements in power efficiency can be made is in backlighting of LCD panels. Generally, a plurality of LEDs (light-emitting diodes) are used to illuminate the LCD panels. Monochrome LCD panels are generally illuminated by monochromatic LEDs such as green, amber, and the like. White LEDs are used to illuminate color LCD panels because of the color spectrum required by the color LCD panels.

The brightness of an LED is a function of the current that passes through the light-emitting diode. The currents that pass through the various LEDs within an LCD panel are accurately matched such that the various LEDs have the same brightness. Higher currents result in greater brightness and increased power consumption, which drains the power from the battery more quickly.

Greater brightness results in increased contrast, which increases the readability of displays especially within sunlit conditions. Less contrast is needed in relatively low light environments, which allows the current consumption of the backlight LEDs to be reduced. A circuit in accordance with the present invention automatically adjusts the backlight intensity to match ambient light conditions, which substantially reduces the average current consumed by the backlight LEDs. Because panel illumination represents a significant percentage of the total power budget for a portable device, optimizing the current consumption can dramatically extend the battery life in the portable device.

Briefly stated, the invention is related to control circuitry for backlighting of electronic displays. A light sensor (such as a phototransistor) is used to continuously measure ambient light conditions that are associated with an electronic display. A linear, continuous light-level signal is produced in response to the continuous measuring by the light sensor. The light-level signal is applied to a first input pin of an operational amplifier. The operational amplifier produces an output signal that is linear with respect to the light-level signal. The output signal is coupled to a second input pin, which provides feedback for the amplifier. The output signal is further coupled to an LED driver for driving backlighting LEDs.

A suitable light sensor typically has a strength vs. angular displacement curve that is relatively broad such that light across the visual light spectrum can be detected. Additionally, the operating voltage of the light sensor can be minimized to conserve power. For example, a photodiode light sensor having a VCE of 3V or less can be used. For higher efficiency, the collector operating current can be set to lower values. Operating at a lower collector current generally slows down the response time of a phototransistor, but usually not to the extent in which the detected ambient light changes.

FIG. 1 illustrates an example of switched capacitor automatic ambient light compensation circuit (100) that is arranged in accordance with aspects of the present invention. Compensation circuit 100 includes operational amplifier X1, current regulator X2, charge pump X3, bandgap reference X4, transistors M1 and Q1, capacitors C1–C3, light emitting diodes D1–D4, and resistors R1–R5. Transistor Q1 is shown as a phototransistor that is arranged as a light sensor. Transistor Q1 provides a feedback signal in response to the ambient light that transistor Q1 receives.

Current regulator X2 is, for example, a current mirror that is arranged to provide regulated currents for driving LEDs D1–D4 in response to the current conducted by transistor M1. The regulated driving currents are typically matched to within 0.5 percent. Resistor R5 is arranged as a sensitivity-adjust resistor and is optional.

Resistor R4 is arranged to determine the amount of current for driving LEDs D1–D4 in low ambient light conditions. In low ambient light conditions transistor Q1 is turned off and the collector current is negligible. The value for resistor R4 is selected such that the amount of current for driving LEDs D1–D4 in bright ambient light conditions does not exceed the maximum allowable current for the LEDs.

Figure 2:
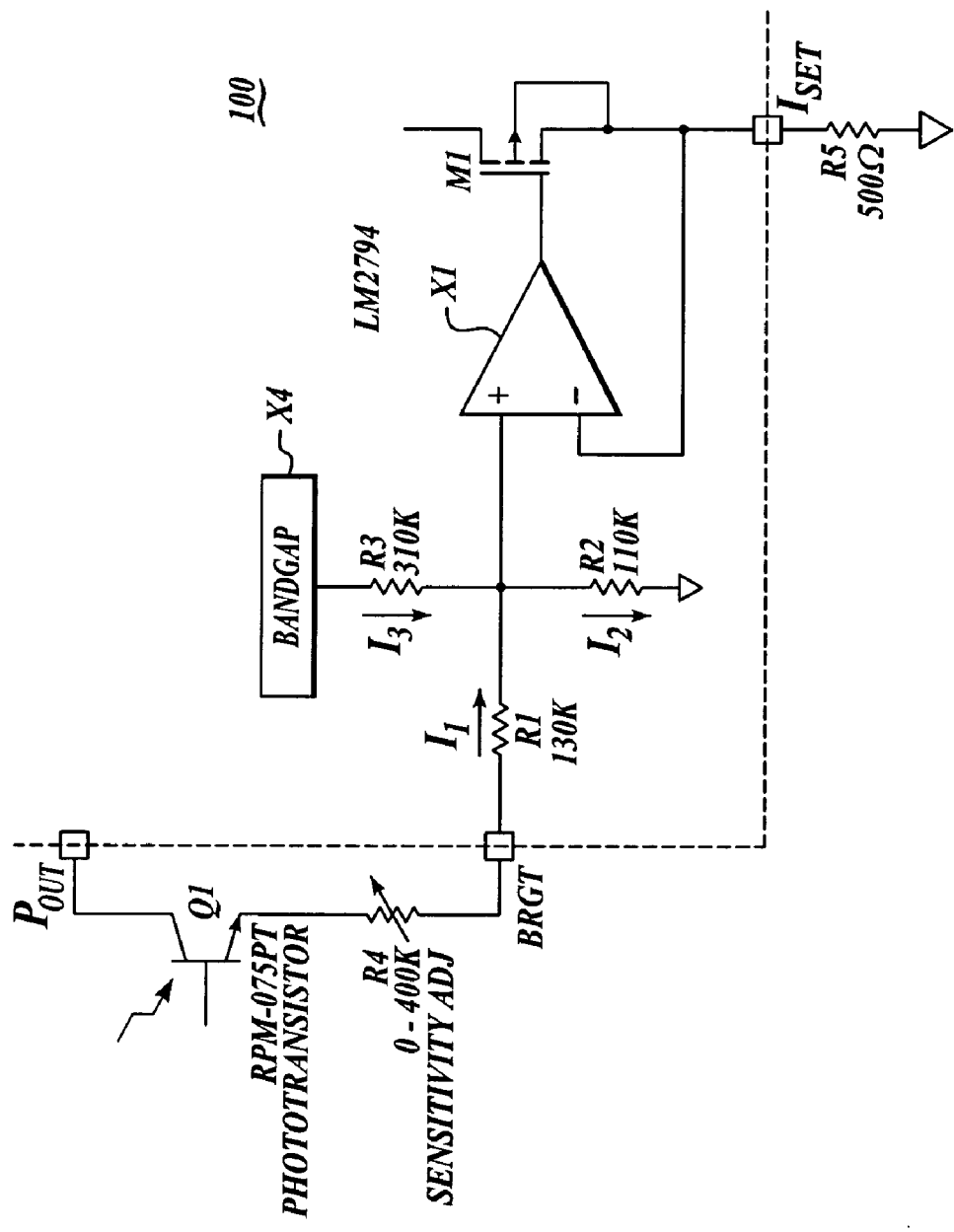
FIG. 2 illustrates a detailed example of switched capacitor automatic ambient light compensation circuit that is arranged in accordance with aspects of the present invention.

FIG. 2 illustrates a detailed example of switched capacitor automatic ambient light compensation circuit (100) that is arranged in accordance with aspects of the present invention. In the illustrated embodiment, a resistance of 500 Ω is selected for resistor R4, which results in an LED driving current of 6.5 mA in low ambient light conditions and less than 20 mA in bright ambient light conditions. The phototransistor current flowing through resistor R2 raises the voltage of node BRGT, which increases the voltage of the positive input of current control loop amplifier X1. The LED current is a function of VSET. VSET is calculated as follows for a zero current condition in resistor R1:

$VSET = VBANDGAP \times R2/(R3+R2)$ $VSET = 1.25V \times 110K\Omega/(310K\Omega + 110K\Omega) = 0.327$ V Accordingly, the LED current in low ambient light conditions can be determined as follows:

$ILED = ISET \times 10 = (VSET/RSET) \times 10 = 6.5$ mA

The required phototransistor current for determining a given LED current of 20 mA (which in this case is the maximum safe current in bright ambient light conditions), the following calculation can be used:

$ISET = ILED/10 = 2$ mA, and $VSET = 1V$ $(RSET = 500\ \Omega)$

From Kirchoff's law:

$I1 + I3 = I2$ $I1 + (1.25 - VSET)/R3 = VSET/R2$ $I1 = (VSET/R2) - ((1.25 - VSET)/R3)$ $I1 = 0.009$ mA $- 0.000806$ mA $= 0.00828$ mA

The phototransistor operating point is be selected to provide the desired current under the associated lighting condition. An optional external resistor (R4) can be provided in series with the phototransistor and the node BRGT. Resistor R4 provides an additional adjustment range when further reductions in LED current are desired. Table I shows typical LED currents with the components of the embodiment shown in FIG. 2 that result in various lighting conditions. Under total darkness for example, the phototransistor current is zero and $V_{SAT}$ is equal to $V_{BRGT}$.

TABLE I

| LED Current | Ambient light |
|---|---|
| 20 mA | Bright light |
| 16 mA | Normal office lighting |
| 8 mA | Dimly lighted office |

Resistor values are selected to prevent voltages on BRGT that may cause the LED current to exceed a total of 80 mA. Excessive currents can cause damage to an integrated circuit that comprises circuit 100 and/or cause circuit 100 to not meet operating specifications.

Figure 3:
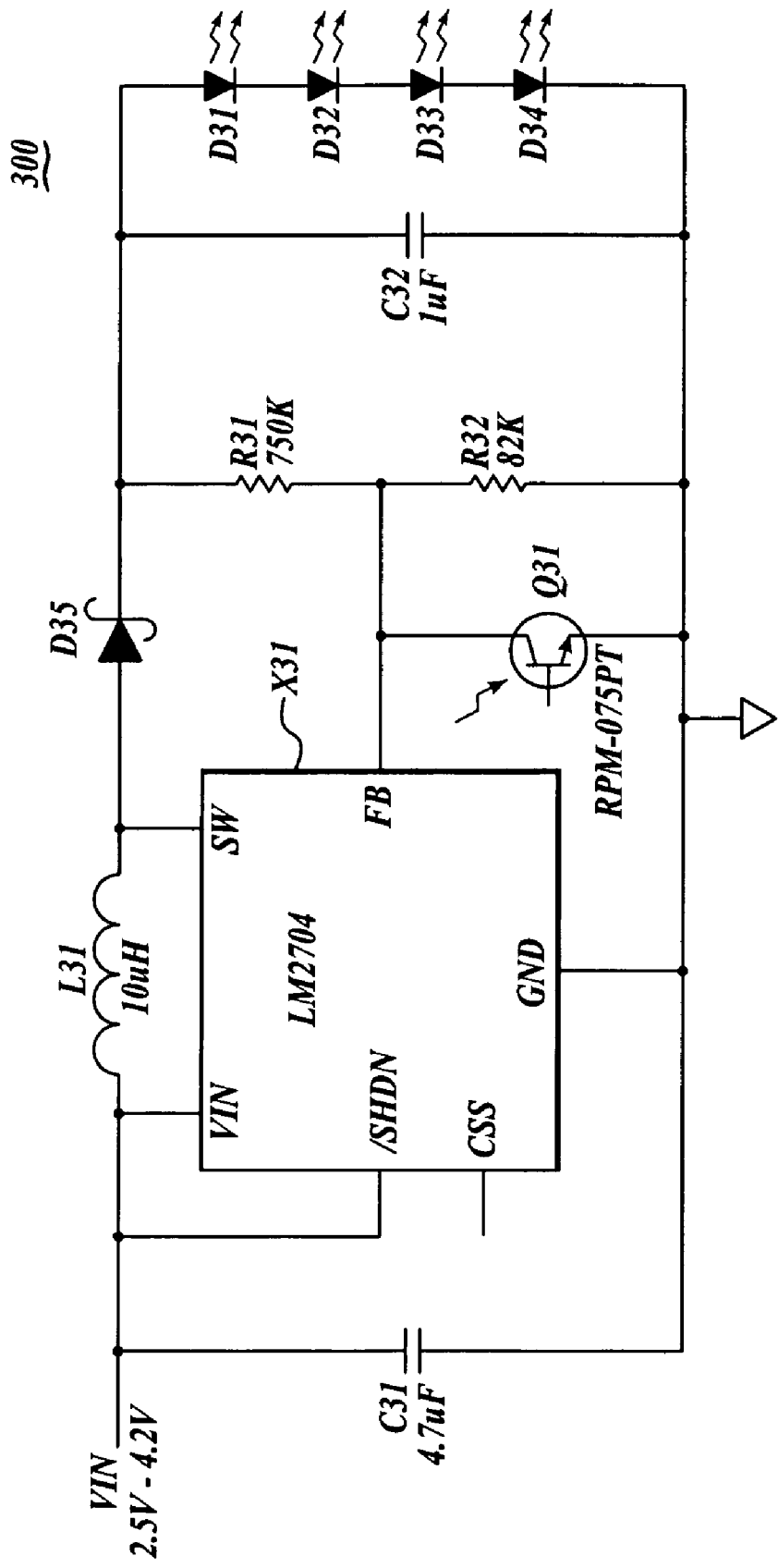
FIG. 3 illustrates an example of an electromagnetic automatic ambient light compensation circuit that is arranged in accordance with aspects of the present invention.

FIG. 3 illustrates an example of an electromagnetic automatic ambient light compensation circuit (300) that is arranged in accordance with aspects of the present invention. Circuit 300 comprises switching circuit X31, capacitors C31–C32, inductor L31, phototransistor Q31, LEDs D31–D34, and diode D35. Switching circuit X31 is an LM2704 integrated circuit, such as manufactured by National Semiconductor, Inc.

Inductor L31 operates in conjunction with switching circuit X31 and diode D35 to operate as a magnetic boost converter. The magnetic boost converter provides the necessary voltage to drive the white LEDs (D31–D34) in a chain (i.e., series) configuration, which ensures current matching through each LED (D31–D34) for uniform brightness. The number of LEDs to be driven is used to determine the operating output voltage. The circuit parameters are set for operation within normal lighting conditions. Additionally, the design is optimized for minimum power consumption and component count.

The phototransistor current, which passes through resistor R31, provides an ambient light feedback signal. The current through phototransistor Q31 drops to zero in response to the phototransistor being in total darkness. The current through phototransistor Q31 increases to 3.28 μA in response to exposing the phototransistor to relatively bright light.

The backlight intensity and glare is reduced when phototransistor exposed to low ambient light conditions, in which conditions the boost converter output voltage is approximately 12.55V. Under normal office lighting conditions, the boost converter output is typically around 15.0V, in which conditions LEDs D31–D34 have a higher light intensity.

Circuit parameters are selected by determining the output voltage range for the desired light intensity range. As shown below, the output voltage for operation in low light is 12.55V and the output voltage for operation in bright light is 15V. Other voltage ranges can be determined for other specific lighting conditions and applications. A suitable operating range for phototransistor Q31 can be selected by consulting the phototransistor collector current graph such that total current consumption is reduced.

An output voltage of 15V is selected for brightly driving the series of LEDs D31–D34. The output voltage of circuit 300 is determined by the changes in the current conducted by resistor R31. To develop a voltage of 15V, the collector current of phototransistor Q31 increases to 3.28 μA under normal office lighting conditions. Resistor R31 is accordingly (15V−12.55V)/3.28 μA, which equals 747KΩ. A standard value of 750 KΩ can be used for resistor R31.

The value for resistor R32 can be calculated in accordance with the low lighting voltage (12.55V) and a phototransistor collector current of zero. Resistor R32 is accordingly 1.23V×750 KΩ/(12.55V−1.23V), which equals 81.k KΩ. A standard value of 82 KΩ can be used for resistor R32.

Figure 4:
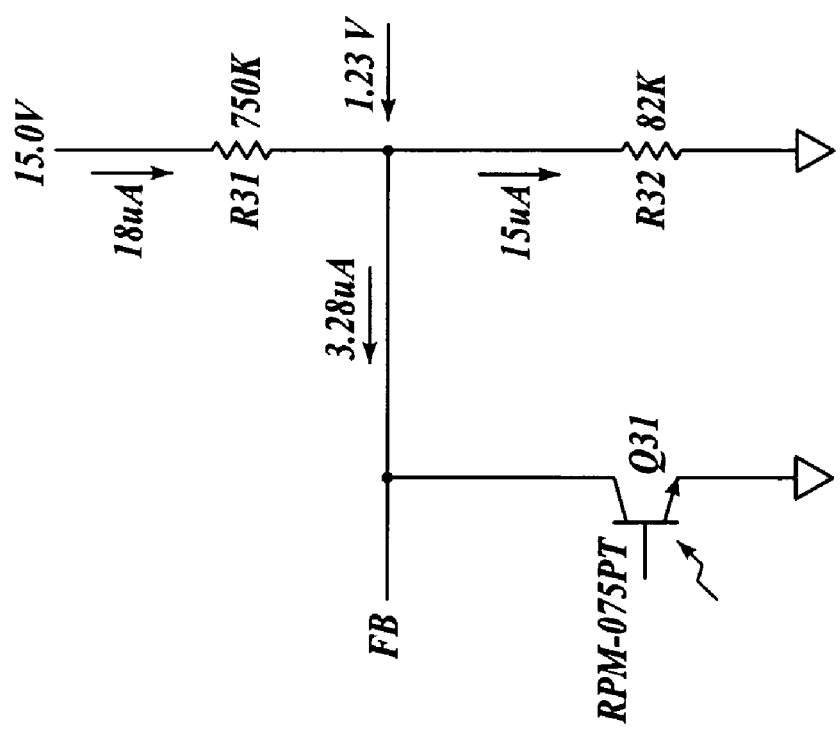
FIG. 4 illustrates currents in typical office lighting conditions of an example electromagnetic automatic ambient light compensation circuit that is arranged in accordance with aspects of the present invention.

FIG. 4 illustrates currents in typical office lighting conditions of an example electromagnetic automatic ambient light compensation circuit that is arranged in accordance with aspects of the present invention. As illustrated in the figure, the collector voltage of phototransistor Q31 is 1.23V and the collector current is 3.28 μA.

Figure 5:
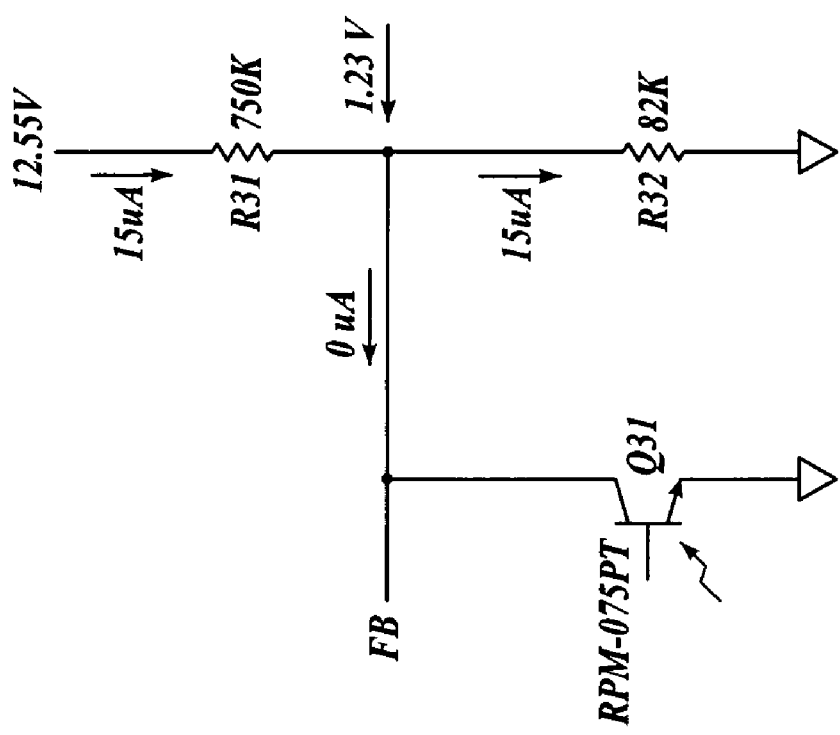
FIG. 5 illustrates currents in total darkness lighting conditions of an example electromagnetic automatic ambient light compensation circuit that is arranged in accordance with aspects of the present invention.

FIG. 5 illustrates currents in total darkness lighting conditions of an example electromagnetic automatic ambient light compensation circuit that is arranged in accordance with aspects of the present invention. As illustrated in the figure, the collector voltage of phototransistor Q31 is 1.23V and the collector current is zero.

Various embodiments of the invention are possible without departing from the spirit and scope of the invention. For example, complementary logic (and components) can be used in accordance with the embodiment described above. The above specification, examples and data provide a complete description of the manufacture and use of the composition of the invention. Since many embodiments of the invention can be made without departing from the spirit and scope of the invention, the invention resides in the claims hereinafter appended.

embodiments of the invention can be made without departing from the spirit and scope of the invention, the invention resides in the claims hereinafter appended.

I claim:

1. A method for controlling backlighting, comprising:
   continuously measuring ambient light conditions with a light sensor;
   producing a continuous light-level signal in response to the continuous measuring by the light sensor;
   producing a continuous feedback signal in response to the continuous light-level signal, wherein the continuous feedback signal is produced by summing the continuous light-level signal and a voltage reference signal at a first input node of an amplifier, and wherein the continuous feedback signal is provided by coupling an output of the amplifier to a second input pin of the amplifier; and
   producing a signal for driving backlighting in response to the continuous feedback signal such that the driving signal drives the backlighting in proportion to ambient light.

2. The method of claim 1, wherein the voltage reference signal is produced by a bandgap voltage reference.

3. The method of claim 1, wherein the continuous light-level signal is produced by supplying current from the continuous feedback signal to the light sensor.

4. The method of claim 1, wherein the continuous light-level signal is produced by resistively coupling the driving signal to the light sensor.

5. The method of claim 1, wherein the driving signal is produced by a switching circuit and an inductor, wherein the switching circuit operates in response to the continuous feedback signal.

6. A circuit for controlling backlighting, comprising:
   means for continuously measuring ambient light;
   means for producing a continuous light-level signal in response to the continuous measuring by the ambient light measuring means;
   amplifier means for producing a continuous feedback signal in response to the continuous light-level signal, wherein the continuous feedback signal is produced by summing the continuous light-level signal and a voltage reference signal at a first input node of the amplifier means, and wherein the continuous feedback signal is provided by coupling an output of the amplifier means to a second input pin of the amplifier means; and
   means for producing a signal for driving backlighting in response to the continuous feedback signal such that the driving signal drives the backlighting in proportion to ambient light.

7. The circuit of claim 6, wherein the voltage reference signal is produced by a bandgap voltage reference.

8. The circuit of claim 6, wherein the continuous light-level signal is produced by supplying current from the continuous feedback signal to the ambient light measuring means.

9. The circuit of claim 6, wherein the continuous light-level signal is produced by resistively coupling the driving signal to the ambient light measuring means.

10. The circuit of claim 6, wherein the driving signal is produced by a switching means and an inductor, wherein the switching means is arranged to operate in response to the continuous feedback signal.

11. A circuit for controlling backlighting, comprising:
    a light sensor that is arranged to continuously measuring ambient light conditions;
    a resistor that is arranged to produce a continuous light-level signal in response to the continuous measuring by the light sensor;
    an amplifier that is arranged to produce a continuous feedback signal in response to the continuous light-level, and wherein the continuous feedback signal is provided by coupling an output of the amplifier to a second input pin of the amplifier; and
    a driver that is arranged to produce a signal for driving backlighting in response to the continuous feedback signal such that the driving signal drives the backlighting in proportion to ambient light.

12. The circuit of claim 11, wherein the continuous feedback signal is coupled to the light sensor.

13. The circuit of claim 11, wherein the driving signal is produced by a switching circuit and an inductor, wherein the switching circuit is arranged to operate in response to the continuous feedback signal.

* * * * *